US011906468B2

(12) United States Patent
Kraljic et al.

(10) Patent No.: US 11,906,468 B2
(45) Date of Patent: Feb. 20, 2024

(54) ACOUSTIC PROFILING TECHNIQUES FOR NON-DESTRUCTIVE TESTING

(71) Applicant: Evident Canada, Inc., Québec (CA)

(72) Inventors: Ivan C. Kraljic, Saint-Gervais (CA);
Benoit Lepage, L'Ancienne-Lorette (CA); Guillaume Painchaud-April, L'Ancienne-Lorette (CA)

(73) Assignee: Evident Canada, Inc., Québec (CA)

(*) Notice: Subject to any disclaimer, the term of this patent is extended or adjusted under 35 U.S.C. 154(b) by 28 days.

(21) Appl. No.: 17/649,818

(22) Filed: Feb. 3, 2022

(65) Prior Publication Data

US 2022/0341879 A1    Oct. 27, 2022

Related U.S. Application Data

(60) Provisional application No. 63/178,703, filed on Apr. 23, 2021.

(51) Int. Cl.
| | |
|---|---|
| *G01N 29/06* | (2006.01) |
| *G01N 29/07* | (2006.01) |
| *G01N 29/26* | (2006.01) |
| *G01N 29/24* | (2006.01) |
| *G06N 20/00* | (2019.01) |

(52) U.S. Cl.
CPC ......... *G01N 29/0654* (2013.01); *G01N 29/07* (2013.01); *G01N 29/2437* (2013.01); *G01N 29/262* (2013.01); *G06N 20/00* (2019.01); *G01N 2291/011* (2013.01); *G01N 2291/023* (2013.01); *G01N 2291/0289* (2013.01); *G01N 2291/106* (2013.01)

(58) Field of Classification Search
CPC .............. G01N 29/0654; G01N 29/07; G01N 29/2437; G01N 29/262; G01N 29/4481; G01N 2291/011; G01N 2291/023; G01N 2291/0289; G01N 2291/106; G01N 2291/0231; G01N 2291/02854; G06N 20/00
See application file for complete search history.

(56) References Cited

U.S. PATENT DOCUMENTS

| | | | |
|---|---|---|---|
| 2017/0285151 A1* | 10/2017 | Huang | ................ G01S 15/8986 |
| 2020/0286208 A1 | 9/2020 | Halupka et al. | |
| 2021/0196207 A1* | 7/2021 | Shamir | ................ G06T 7/0012 |
| 2022/0018811 A1* | 1/2022 | Al-Hashmy | ........... G06V 10/82 |

* cited by examiner

*Primary Examiner* — Suman K Nath
(74) *Attorney, Agent, or Firm* — Schwegman Lundberg & Woessner, P.A.

(57) ABSTRACT

An acoustic inspection system can be used to generate a surface profile of a component under inspection, and then can be used to perform the inspection on the component. The acoustic inspection system can obtain acoustic imaging data, e.g., FMC data, of the component. Then, the acoustic inspection system can apply a previously trained machine learning model to an encoded acoustic image, such as a TFM image, to generate a representation of the profile of one or more surfaces of the component. In this manner, no additional equipment is needed, which is more convenient and efficient than implementations that utilize additional components that are external to the acoustic inspection system.

19 Claims, 5 Drawing Sheets

ACOUSTIC PROFILING TECHNIQUES FOR NON-DESTRUCTIVE TESTING

CLAIM OF PRIORITY

This application claims the benefit of priority of U.S. Provisional Patent Application Ser. No. 63/178,703, titled "ACOUSTIC PROFILING TECHNIQUES FOR NON-DESTRUCTIVE TESTING" to Ivan C. Kraljic et al., filed on Apr. 23, 2021, the entire contents of which being incorporated herein by reference.

FIELD OF THE DISCLOSURE

This document pertains generally, but not by way of limitation, to non-destructive testing and inspection devices (NDT/NDI).

BACKGROUND

Various techniques can be used to perform inspection of structures in a non-destructive manner. Such techniques can include use of ionizing radiation such as X-rays for inspection, electromagnetic techniques such as eddy-current techniques, or acoustic techniques, as illustrative examples. In one approach, an ultrasonic transducer or an array of such transducers can be used to inspect a structure using acoustic energy. Ultrasonic inspection is useful for inspection of a variety of different structures including bar-shaped or tubular structures, welds, planar (e.g., plate materials), and composite materials such as carbon-fiber reinforced composite structures.

Inhomogeneities on or within the structure under test can generate scattered or reflected acoustic signals in response to a transmitted acoustic pulse. Such acoustic "echoes" can be received and processed. Such processing can include reconstruction of an image corresponding to a region of the structure under test, for review by an inspector or for archival. Features within the structure that can be detected and thereby imaged include interfaces between materials having different acoustic propagation characteristics, such as voids, cracks, or other flaws, and structures such as welds, joints, cladding layers, or surfaces.

An acoustic acquisition technique called a "total focusing method" (TFM) can be used, such as involving a full-matrix capture (FMC) acquisition scheme where focus can be achieved across a broad spatial region on or within a material under test. However, it can be challenging to use TFM techniques on components with complex surfaces. To generate accurate results using TFM techniques, the surface profile needs to be known.

SUMMARY OF THE DISCLOSURE

Using various techniques of this disclosure, an acoustic inspection system can be used to generate the surface profile of the component, and then can be used to perform the inspection on the component. The acoustic inspection system can obtain acoustic imaging data, e.g., FMC data, of the component. Then, the acoustic inspection system can apply a previously trained machine learning model to an encoded acoustic image, such as a TFM image, to generate a representation of the profile of one or more surfaces of the component. In this manner, no additional equipment is needed, which is more convenient and efficient than implementations that utilize additional components that are external to the acoustic inspection system.

In some aspects, this disclosure is directed to a computerized method of automatically determining a representation of a profile of a surface of an object using a trained machine learning model, the method comprising: obtaining acoustic imaging data of the object; generating, using the acoustic imaging data and a time-of-flight (TOF) delay associated with a medium, a first encoded acoustic image of the object; and applying a previously trained machine learning model to the first encoded acoustic image to generate the representation of the profile of the surface.

In some aspects, this disclosure is directed to a computerized method of training processing circuitry using machine learning, the method comprising: training a machine learning model to be used to automatically determine a representation of a profile of a surface of an object based on acoustic imaging data of the object.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As mentioned above, acoustic techniques can be used to perform non-destructive testing (sometimes referred to generally as non-destructive evaluation) of materials by coupling acoustic energy onto or within such materials and detecting scattered or reflected energy corresponding to features on or within such materials under test.

The hallmark of ultrasonic phased array is the capacity to focus and steer an acoustic beam at a desired position in a material under inspection. The phased array focusing approach uses delays, applied on both the transmission and reception elements of the phased array probe, to synchronize the time of flights of short, pulsed waveforms at the position of interest. At the focal zone in the material, the width of the generated acoustic beam narrows, and the corresponding detection resolution increases.

Conventional phased array uses the physical superposition of elementary acoustic waves in transmission to produce an acoustic beam aimed at a specific focused depth in the material under inspection. The set of transmitter elements form an aperture from which a coherent acoustic pulse emerges. The action of conventional phased array transmission is referred to as beamforming. In an S-scan, for instance, beamforming acquisition occurs for each user-specified angle.

In some approaches, a plurality of acoustic transducers can be used to perform such acoustic inspection. Such a plurality of transducers can be referred to as an "array," but such an array need not be planar or linear in arrangement or orientation and need not have a constant pitch between respective transducer elements.

Processing of received acoustic echo signals to form images can involve various techniques. In one acoustic acquisition approach, respective received acoustic echo signals can be "delayed and summed" to provide focusing within a specific locus on or within the material under test.

In another approach, an acoustic acquisition technique called a "total focusing method" (TFM) can be used, such as involving a full-matrix capture (FMC) acquisition scheme where focus can be achieved across a broad spatial region on or within a structure under test. TFM also uses a delay-and-sum algorithm. Several TFM propagation modes are available, where the TFM propagation modes represent the path of ultrasound waves from the transmitter to an image pixel in a TFM zone and back to the receiver (including reflections).

The TFM acoustic propagation modes are defined by the types of waves (transverse or longitudinal) for each leg of the path. A pulse-echo mode is any propagation mode where the transmitted beam and the reception beam follow the exact same path in the inspected piece. Pulse-echo modes can be achieved in a direct path with no skips, such as TT, or with multiple skips, e.g., TT-TT. In a self-tandem mode, e.g., TT-T, the transmission and reception propagation paths do not match exactly, but the transmitting and receiving elements are on the same phased array probe. Pulse-echo and self-tandem propagation modes are not specific to the TFM; they can be obtained in a conventional phased array as well as the TFM.

The TFM algorithm is a form of dimensionality reduction, where acoustic data, typically arranged into a full matrix capture (FMC) matrix (a typical size can be 1024×4000 or greater) are summed using predefined generation parameters to form an image. A typical size of a TFM image can be 1024×1024 pixels or less.

Various generation parameters can be used to generate an image, such as a TFM image. For example, generation parameters can include wedge velocity, wedge angle, wedge first elements height, wedge radius, part velocity, part thickness, and/or the selected acoustic propagation mode(s).

To produce a pixel or voxel in an acoustic image of an object using TFM, for example, a processor can calculate the delays associated with that pixel or voxel using the acoustic data, such as data in an FMC matrix, that was acquired by the acoustic imaging system using one or more of the generation parameters. The processor can determine the amplitude at the particular delay, generate a scattering matrix ("S-matrix"), and then generate an image of the material being inspected. Each combination element-voxel has an associated delay. These delays can be used to determine the relevant data in the full matrix of acoustic data. The "particular delay" represents the delay needed for a specific combination of elements and pixel/voxel. The S-matrix, once summed by TFM, can be used by the processor to produce a pixel or voxel to generate an image.

As mentioned above, it can be challenging to use TFM techniques on components with complex surfaces. To generate accurate results using TFM techniques, the surface profile needs to be known. In some implementations, techniques that use lasers can be used to generate a profile of the surface of the components.

Figure 1:
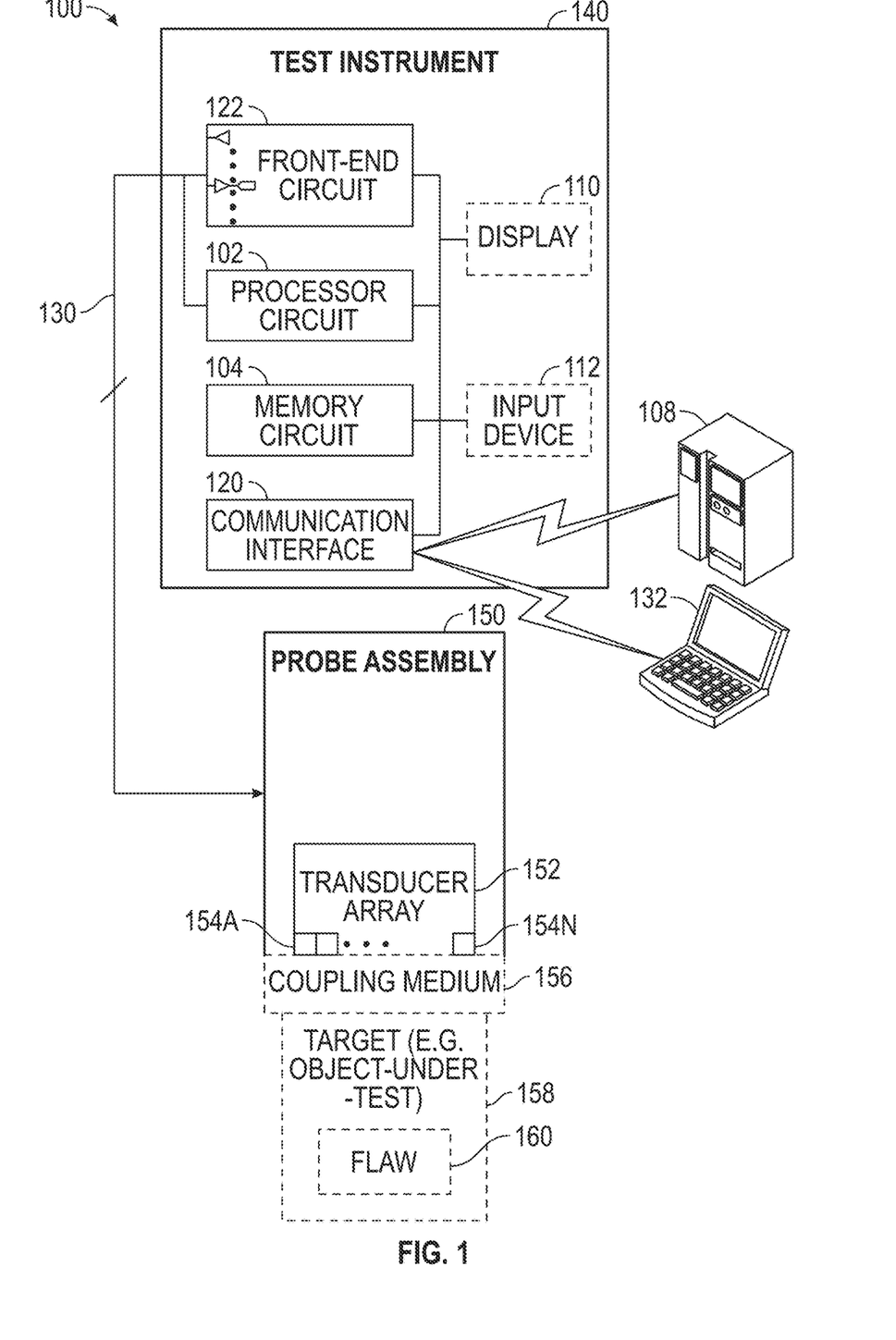
FIG. 1 illustrates generally an example of an acoustic inspection system, such as can be used to perform one or more techniques described herein.

The present inventors have recognized the desirability of using the acoustic inspection system itself to generate a surface profile of the component (also referred to as the object or material) under inspection when only part of a surface is "visible" with ultrasound. Using various techniques of this disclosure, the acoustic inspection system, such as shown in FIG. 1, can be used to generate the surface profile of the component, and then can be used to perform the inspection on the component. As described in more detail below, the acoustic inspection system can obtain acoustic imaging data, e.g., FMC data, of the component. Then, the acoustic inspection system can apply a previously trained machine learning model to an encoded acoustic image, such as a TFM image, to generate a representation of the profile of one or more surfaces of the component. In this manner, no additional equipment is needed, which is more convenient and efficient than implementations that utilize additional components that are external to the acoustic inspection system.

FIG. 1 illustrates generally an example of an acoustic inspection system 100, such as can be used to perform one or more techniques described herein. The acoustic inspection system 100 can perform ultrasonic NDT techniques. The acoustic inspection system 100 of FIG. 1 is an example of an acoustic imaging modality, such as an acoustic phased array system, that can implement various techniques of this disclosure.

The acoustic inspection system 100, also referred to in this disclosure as an acoustic inspection system, can include a test instrument 140, such as a hand-held or portable assembly. The test instrument 140 can be electrically coupled to a probe assembly, such as using a multi-conductor interconnect 130. The electrical coupling can be a wired connection or a wireless connection. The probe assembly 150 can include one or more electroacoustic transducers, such as a transducer array 152 including respective transducers 154A through 154N. The transducers array can follow a linear or curved contour or can include an array of elements extending in two axes, such as providing a matrix of transducer elements. The elements need not be square in footprint or arranged along a straight-line axis. Element size and pitch can be varied according to the inspection application.

A modular probe assembly 150 configuration can be used, such as to allow a test instrument 140 to be used with various probe assemblies 150. In a non-limiting example, the transducer array 152 can include piezoelectric transducers, such as can be acoustically coupled to a target 158 (e.g., an object under test) through a coupling medium 156. In other examples, capacitive micromachined ultrasonic transducer (CMUT) arrays can be used. The coupling medium can include a fluid or gel or a solid membrane (e.g., an elastomer or other polymer material), or a combination of fluid, gel, or solid structures. The wedge structures can include a rigid thermoset polymer having known acoustic propagation characteristics (for example, Rexolite® available from C-Lec Plastics Inc.), and water can be injected between the wedge and the structure under test as a coupling medium 156 during testing.

The test instrument 140 can include digital and analog circuitry, such as a front-end circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification.

Although FIG. 1 shows a single probe assembly 150 and a single transducer array 152, other configurations can be used, such as multiple probe assemblies connected to a single test instrument 140, or multiple transducer arrays 152 used with a single or multiple probe assemblies 150 for tandem inspection. Similarly, a test protocol can be performed using coordination between multiple test instruments 140, such as in response to an overall test scheme established from a master test instrument 140, or established by another remote system such as a computing facility 108 or general purpose computing device such as a laptop 132, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit 122 can be coupled to and controlled by one or more processor circuits, such as a processor circuit 102 included as a portion of the test instrument 140. The processor circuit 102 can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a computing facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of data or intermediate data such as A-line matrices of time-series data can be accomplished using remote facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, or the like, for receiving operator commands, configuration information, or responses to queries.

The acoustic inspection system 100 can acquire acoustic imaging data of the object under inspection, such as using FMC, half matrix capture (HMC), virtual source aperture (VSA), or plane wave imaging, of a material using an acoustic acquisition technique, such as an acoustic phased array system. The processor circuit 102 can then generate an acoustic imaging data set, such as a scattering matrix (S-matrix), plane wave matrix, or other matrix or data set, corresponding to an acoustic propagation mode, such as pulse echo direct (TT), self-tandem (TT-T), and/or pulse echo with skip (TT-TT).

Using the acoustic imaging data, e.g., FMC data, and a time-of-flight (TOF) delay associated with a medium, such as water, the processor circuit 102 or another processor circuit can generate an encoded acoustic image of the object under inspection. For example, the encoded acoustic image can be generated using techniques such as a total focusing method (TFM) technique.

To generate an image, an acoustic inspection system, such as the acoustic inspection system 100 of FIG. 1, can use inspection parameters and generation parameters. Inspection parameters need to be known, such as by being input by an operator before a scan begins, without regards to the final acoustic image to be generated. Inspection parameters can include the following: A-scan start (time at the first sample data), sample time resolution, frequency of the probe, number of elements in the probe, and other characteristic of the probe such as element size, pitch, and bandwidth of the probe.

Generation parameters and many inspection parameters are used to generate an acoustic image from the acoustic data. Generation parameters can include selected acoustic mode, nominal thickness of part, acoustic velocities of different mode (pressure wave, shear wave, Rayleigh wave) in the different material (part, wedge), and a region of interest (size, position, and/or resolution). An acoustic image, such as a TFM image, can be generated using at least one generation parameter and first acoustic data, such as FMC data, where the first acoustic data can be acquired at least in part by an acoustic acquisition technique, such as an acoustic phased array system.

In accordance with this disclosure, the acoustic inspection system 100 of FIG. 1 can be used to generate one or more surface profiles of the component, e.g., a varying surface profile, and then can be used to perform the inspection on the component. As described in more detail below, the processor 102 or another processor of the acoustic inspection system 100 can apply a previously trained machine learning model to the encoded acoustic image, such as a TFM image, to generate a representation of the profile of one or more surfaces of the component. By using these techniques, no additional equipment is needed, which is more convenient and efficient than implementations that utilize additional components that are external to the acoustic inspection system. Training a machine learning model is described below with respect to FIG. 5.

Figure 2:
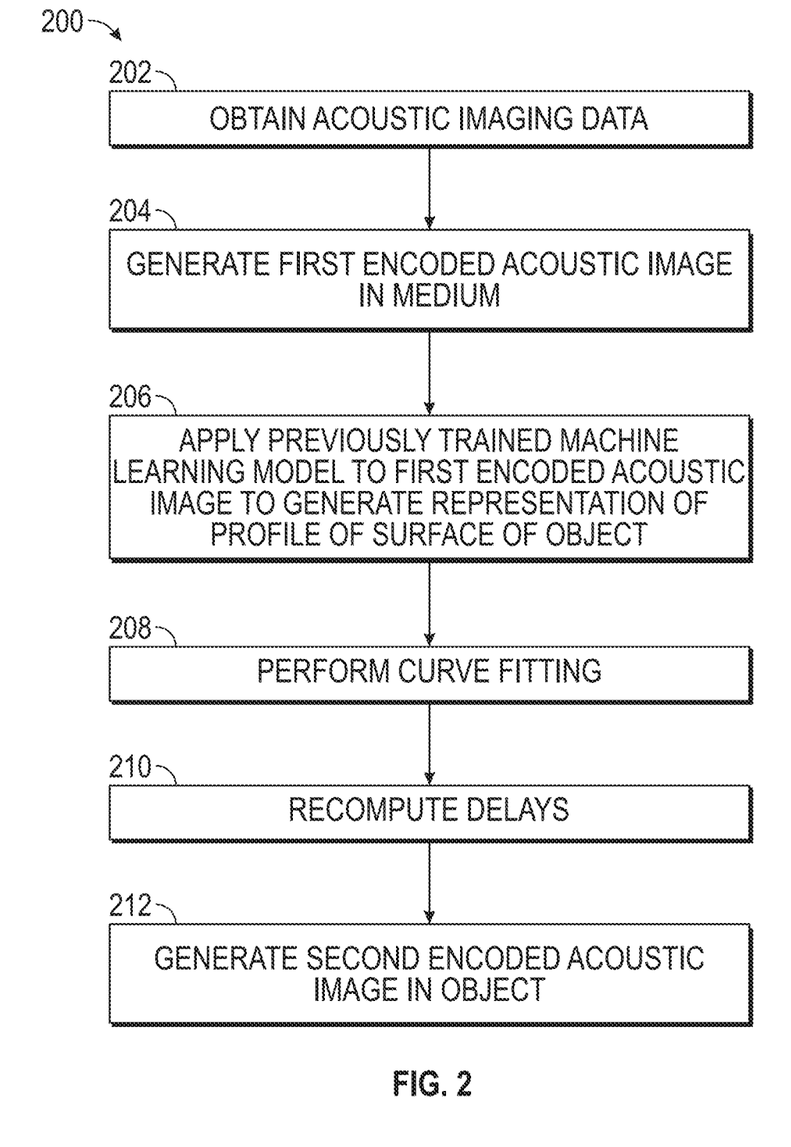
FIG. 2 is a flow diagram illustrating a non-limiting example of a computerized method of automatically determining a representation of a profile of at least one surface of an object under inspection using a trained machine learning model.

FIG. 2 is a flow diagram illustrating a non-limiting example of a computerized method 200 of automatically determining a representation of a profile of at least one surface of an object under inspection using a trained machine learning model. At block 202, an acoustic inspection system, such as the acoustic inspection system 100 of FIG. 1 can obtain acoustic imaging data, such as FMC data, of the object, using an acoustic acquisition technique, such as an acoustic phased array system. The acoustic inspection system 100 can acquire acoustic imaging data of the object under inspection, such as using FMC, half matrix capture (HMC), virtual source aperture (VSA), plane wave imaging, or sparse matrix capture techniques.

The acoustic inspection system 100 can acquire acoustic imaging data of the object under inspection, such as using FMC, half matrix capture (HMC), virtual source aperture (VSA), or plane wave imaging, of a material using an acoustic acquisition technique, such as an acoustic phased array system. A processor, such as the processor circuit 102 of FIG. 1, can then generate an acoustic imaging data set, such as a scattering matrix (S-matrix), plane wave matrix, or other matrix or data set, corresponding to an acoustic propagation mode, such as pulse echo direct (TT), self-tandem (TT-T), and/or pulse echo with skip (TT-TT).

At block 204, using the acoustic imaging data, e.g., FMC data, and a time-of-flight (TOF) delay associated with a medium within which the object is positioned, e.g., a medium such as water, the processor can generate a first encoded acoustic image of the object under inspection. It should be noted that, in some examples, the TOF delays in the medium can be computed beforehand. The first encoded acoustic image can be generated using a total focusing method (TFM) technique, for example. In TFM, for example, a region-of-interest (ROI) can be defined as a grid that includes a number of points or pixels.

In other examples, the TOF delays may be calculated beforehand but instead through an iterative process, such as when there are multiple surfaces to profile. For example, the TOF delays can be determined in a first medium, a TFM image can be generated in the first medium, and then a first surface can be profiled. Then, the TOF delays can be determined in a second medium, a TFM image can be generated in the second medium, and then a second surface can be profiled, and so forth.

Figure 3:
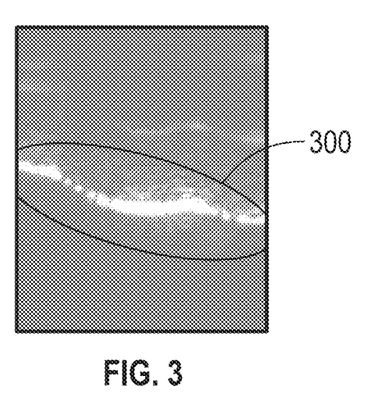
FIG. 3 is an example of a first encoded acoustic image to which a previously trained machine learning model can be applied.

An example of a first encoded acoustic image is shown in FIG. 3. The first encoded acoustic image can depict one or more surfaces of the object under inspection and can be used to track the geometry of the surface(s).

The first encoded acoustic image, e.g., a TFM image, is not focused in the object. The FMC data can be focused anywhere, as long as the correct TOF delays are used. To be focused in the object, the TOF delays for the real acoustic paths need to be known. To determine the real acoustic paths, the profile of the surface of the object under inspection is needed.

Using the techniques of this disclosure, the first encoded acoustic image, such as a TFM image, can be used to determine one or more surface profiles of the object. For example, the first encoded acoustic image, such as a TFM image, can depict a profile of a surface of the object and then the image can be used to track the geometry of the surface. As used in this disclosure, a surface can be an outer surface of an object, and the surface can be defined by a profile, where a profile is the geometric shape or contour of the surface. In some examples, the surface can be an inner surface of an object. Using a second encoded acoustic image, such as a TFM image, that is focused in the object, acoustic inspection of the object can occur.

At block 206, the processor can apply a previously trained machine learning model to the first encoded acoustic image from block 204 to generate a representation of a profile of one or more surfaces of the object. In other words, the previously trained machine learning model can receive as input the encoded acoustic image generated using the TFM image generated in water, for example, and, in response, generate a representation of a profile of one or more surfaces of the object.

When specular reflections occur, strong signals can be returned to the acoustic inspection system. If no specular reflections occur, however, portions of the profile of the surface of the first encoded acoustic image can be missing in the first encoded acoustic image. By applying a previously trained machine learning model to the first encoded acoustic image, the machine learning model can determine a profile of the surface of the object. That is, the machine learning model can generate a more complete profile of the object from one or more portions of the first encoded acoustic image. In this manner, the techniques of this disclosure can generate a representation of a profile of one or more surfaces of an object, such as having a complex geometry, using an acoustic inspection system, such as shown in FIG. 1.

In some examples, the representation of the profile of the surface can include an equation that defines at least a portion of the profile of the surface. In other examples, the representation of the profile of the surface can include an image of the profile of the surface, where the image includes pixels, an example of which being shown in FIG. 4.

Figure 4:
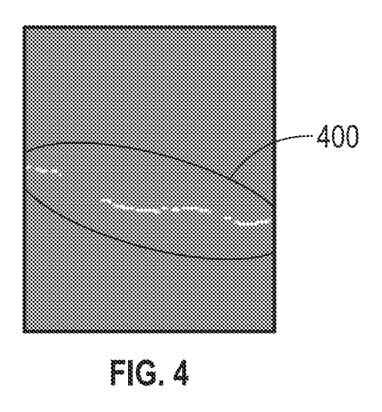
FIG. 4 is an example of an example of a representation of a profile of a surface of an object under inspection generated by a previously trained machine learning model applied to a first encoded acoustic image.

The image of the profile of the surface generated by the previously trained machine learning model can be, for example, a binary image, such as shown in FIG. 4. For example, each pixel in the binary image can belong to one of two classes: 1) background or 2) surface of the object.

In other examples, the image can represent a probability distribution. For example, rather than being binary, the image can represent a probability distribution where the pixel value equals the probability that the pixel is part of a surface. In some examples, the probability distribution can be provided by a softmax output layer that utilizes the softmax function.

As described in more detail below with respect to FIG. 5, a machine learning model can be trained using surfaces and profiles that could be empirical (or "real") data representing surfaces and profiles so that the machine learning model can generalize the problem of solving for a profile of a surface, unlike standard algorithmic techniques. In this manner, the machine learning model can fill in any missing information of the profile of the surface using reasonable assumptions by intelligently extrapolating from the portion(s) available from the first encoded acoustic image. Empirical data can be generated using laser profiling tools, for example, or using a computer-aided design (CAD) drawing and a precisely machined part.

In some instances, empirical data may not be readily available, or that may not be available in sufficient quantity and/or variety. For adequate training, it can be desirable to use a variety of data to train the machine learning model. That is, it can be desirable to train the machine learning model with generalized data rather than specialized data. As such, when empirical data is lacking, the machine learning model can be trained using realistic, simulated (or "synthetic") data. For example, a simulator program, such as executable on the machine 600 of FIG. 6, can simulate data that looks sufficiently close to what is expected from empirical data. The simulator program can produce front wall profiles, for example.

In some examples, the machine learning model can be trained using both the simulated data and the empirical data in a "transfer learning" approach. For example, if a limited amount of empirical data is available, the machine learning model can be trained first using the generalized simulated data and then using limited, available empirical data.

In some examples, the machine learning model can be trained using simulated data that encompasses geometrical or mechanical tolerances that can be expected in the object under inspection. That is, the mechanical tolerances of the object, such as +/−5 millimeters or +/−5°, can be known so that the simulator program can generate signals within those tolerances so that when the machine learning model fills in any missing information of the profile of the surface, it will do so using the known mechanical tolerances.

For example, in the computerized method, a user, for example, can specify a mechanical tolerance of the object, and a simulator program can simulate, using the specified mechanical tolerance, data that represents the plurality of profiles of corresponding surfaces. In some examples, training the machine learning model can include training the machine learning model using both the simulated data and the empirical data. By using the mechanical tolerances of the object, the machine learning model can more precisely extract the profile of the surface of the object.

At block 208, the processor can perform curve fitting, such as by using a curve fitting algorithm, on the representation of the profile of the surface of the object. The output of the previously trained machine learning model can include discontinuities. The objective of the curve fitting is to remove the discontinuities by determining a smooth, continuous interpolated profile of the surface of the object. In some examples, the processor can perform filtering while performing the curve fitting. After performing the curve fitting, the processor can output a vector of points describing the profile of the surface of the object. For example, the processor can output the coordinates of the surface, e.g., (x, y) coordinates, a normal vector to the surface, and an amplitude along the surface.

With TFM techniques, for example, TOF delays can be computed beforehand, such as the TOF delays in the medium used in block 204. With adaptive TFM (ATFM), TOF delays need to be recomputed based on the position of the surface of the object under inspection.

At block 210, the processor can recompute the TOF delays using the vector of points generated from the curve fitting. As mentioned above, the first encoded acoustic image, e.g., a TFM image, generated at block 204 is not focused in the object. Using the surface profile information determined by the curve fitting of block 208, the processor can redefine the grid in the object under inspection and recompute the TOF delays.

Using the recomputed delays from block 210 and the acoustic imaging data, e.g., FMC data, from block 202, the processor can generate a second encoded acoustic image of the object under inspection. For example, the second encoded acoustic image can be generated using techniques such as a total focusing method (TFM) technique.

Although the techniques in FIG. 2 were described with respect to adaptive TFM, the techniques of this disclosure are not limited to adaptive TFM. In addition, the techniques of this disclosure are not limited to adaptive acoustic techniques. For example, acoustic profiling can be used to find the surface of a weld bead in order to automatically generate a representation of the component and also find flaws close to the surface and discriminate those from geometry echoes.

By using the techniques of FIG. 2, the acoustic inspection system itself can generate a surface profile of the object under inspection. In this manner, no additional equipment is needed, which is more convenient and efficient than implementations that utilize additional components that are external to the acoustic inspection system.

FIG. 3 is an example of a first encoded acoustic image to which a previously trained machine learning model can be applied. The first encoded acoustic image shown in FIG. 3, e.g., a TFM image, can be an output of block 204 in FIG. 2. The image in FIG. 3 depicts a region 300 that can be used to identify a profile of a surface of the object. A processor, such as the processor 102 in FIG. 1, can apply a previously trained machine learning model to the first encoded acoustic image in FIG. 3 to generate a representation of a profile of one or more surfaces of the object.

FIG. 4 is an example of an example of a representation of a profile of a surface of an object under inspection generated by a previously trained machine learning model applied to a first encoded acoustic image. The representation of a profile of a surface shown in FIG. 4, e.g., an image with pixels, can be an output of block 206 in FIG. 2. The image in FIG. 4 depicts a region, shown generally at 400, that can include the representation of the profile of the surface of the object. In other examples, the representation can include an equation defining the profile of the surface.

As mentioned above, the output of the previously trained machine learning model can include one or more discontinuities, some of which being depicted in the region 400 of the example shown in FIG. 4. A processor can apply a curve fitting algorithm, for example, to the representation of the profile of the surface of the object in FIG. 4 to determine a smooth, continuous interpolated profile of the surface of the object. Then, as described above with respect to blocks 210 and 212 of FIG. 2, the processor can recompute the TOF delays using the vector of points generated from the curve fitting and, using the recomputed delays and the acoustic imaging data, e.g., FMC data, the processor can generate a second encoded acoustic image of the object under inspection, e.g., a TFM image.

In this manner, the techniques of this disclosure can determine a representation of a profile of at least one surface of an object using a trained machine learning model. In some examples, a semantic segmentation neural network can be used to implement various techniques of this disclosure. The input image can be fed into the network, and the network produces an output image where each pixel either belongs to the surface (profile), or to the background. The network can be trained beforehand on a representative dataset that includes input images and for each image, the expected surface profile to be detected. The machine learning model and its training are described in more detail below with respect to FIG. 5.

Figure 5:
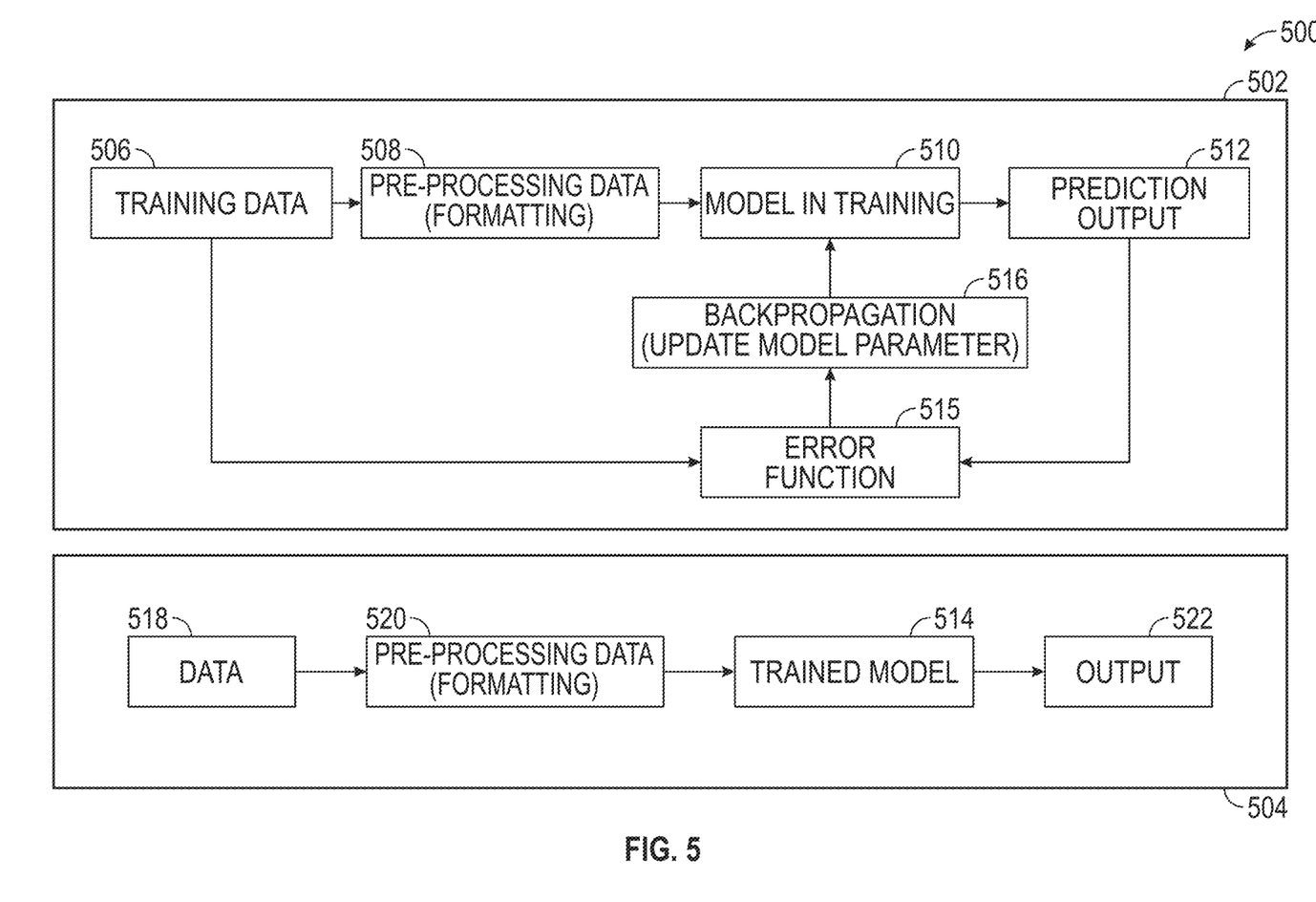
FIG. 5 shows an example of a machine learning module according to some examples of the present disclosure.

FIG. 5 shows an example of a machine learning module 500 according to some examples of the present disclosure. The machine learning module 500 can be implemented in whole or in part by one or more computing devices. In some examples, a training module 502 can be implemented by a different device than a prediction module 504. In these examples, the trained model 514 can be created on a first machine and then sent to a second machine. For example, the training can be performed in a server device, e.g., "in the cloud", and then the trained model can be sent to another device, such as a PC.

The machine learning module 500 utilizes a training module 502 and a prediction module 504. The prediction module 504 is an example of a trained machine learning model, such as used at block 206 of FIG. 2.

Figure 6:
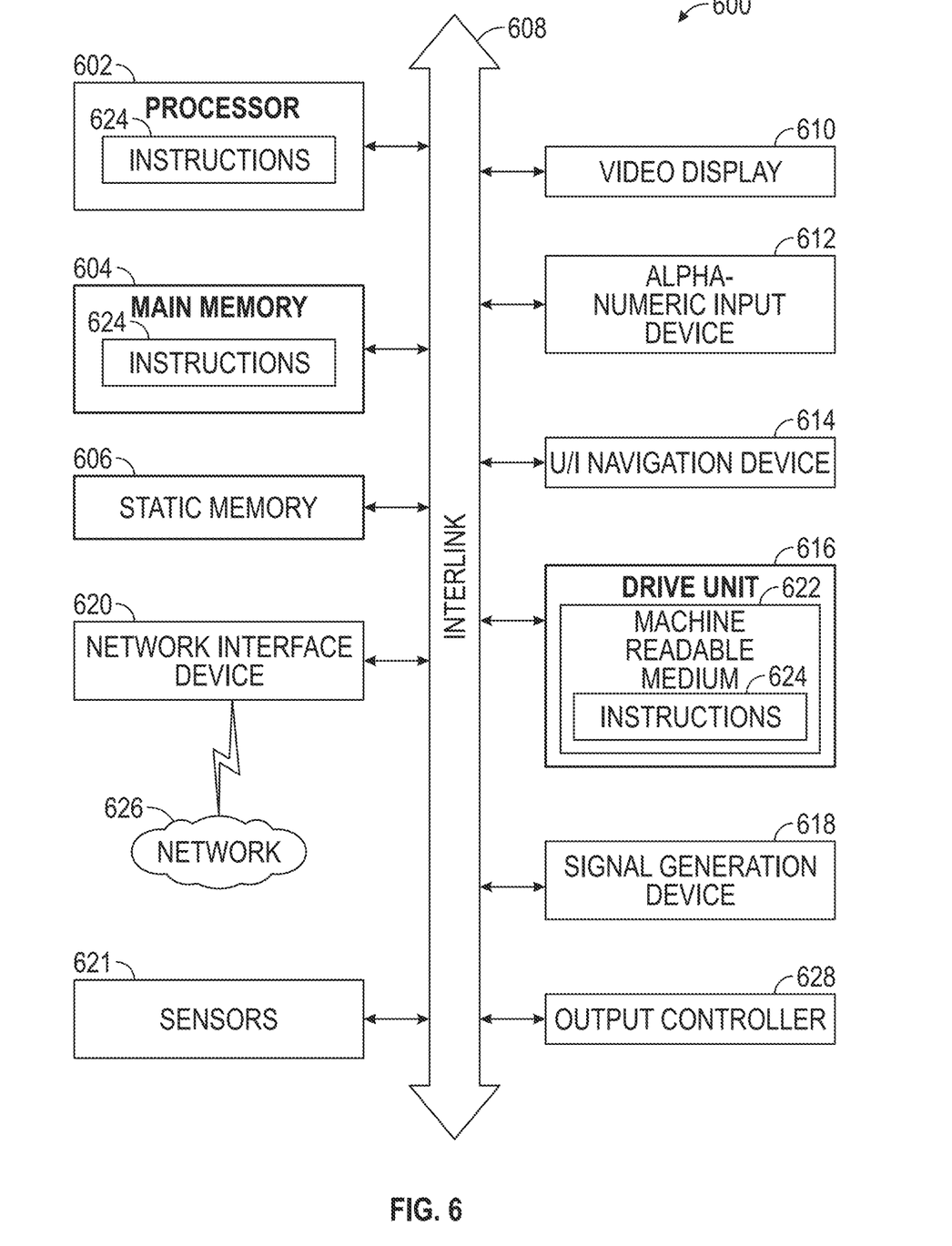
FIG. 6 illustrates a block diagram of an example of a machine upon which any one or more of the techniques (e.g., methodologies) discussed herein can perform.

The training module 502 can implement a computerized method of training processing circuitry, such as the processor 602 of FIG. 6, using machine learning in a system for non-destructive testing (NDT) of a material to automatically determine a representation of a profile of a surface of an object based on acoustic imaging data, e.g., FMC data, of the object, such as shown and described above with respect to FIG. 2. The training data 506 can be formatted using a pre-processing module 508.

The training data 506 can include, for example, empirical (or "real") data of profiles of surfaces of objects. Empirical data can be generated using laser profiling tools, for example, or using a computer-aided design (CAD) drawing and a precisely machined part. Using this training data, the machine learning model-in-training 510 can be trained to go from an encoded acoustic image, e.g., TFM image, to a prediction output 512 that includes a representation of a profile of one or more surfaces of an object under inspection. In some examples, the representation of the profile can include an equation that defines at least a portion of the profile of the surface. In other examples, the representation of the profile of the surface can include an image of the profile of the surface, where the image includes pixels.

In some instances, empirical data may not be readily available. For adequate training, it can be desirable to use a variety of data to train the machine learning model. That is, it can be desirable to train the machine learning model with generalized data rather than specialized data. As such, when empirical data is lacking, the machine learning model can be trained using realistic, simulated (or "synthetic") data. For example, a simulator program, such as executable on the machine 600 of FIG. 6, can simulate data that looks sufficiently close to what is expected from empirical data. The simulator program can produce front wall profiles, for example. Thus, in some examples, the training data 506 can include at least some simulation training data.

In some examples, the machine learning model can be trained using both the simulated data and the empirical data in a "transfer learning" approach. For example, if a limited amount of empirical data is available, the machine learning model can be trained first using the generalized simulated training data 506 and then using limited, available empirical training data 506.

In some examples, the simulated training data 506 can encompass geometrical or mechanical tolerances that can be expected in the object under inspection. That is, the mechanical tolerances of the object, such as +/−5 millimeters or +/−5°, can be known so that a simulator program for generating training data can generate training data 506 within those tolerances so that when the machine learning model fills in any missing information of the profile of the surface, it will do so using the known mechanical tolerances.

During training, the training module 502 can compare the training data 506 and the prediction output 512 and generate an error function 515 based on the comparison. In some examples, the training module 502 can update the model in training 510 in response to the error function 515, such as by using backpropagation module 516.

In the prediction module 504, the data 518 can be input and pre-processed using a pre-processing module 520 to format the data prior to sending to the trained model 514. For example, the data 518 can be a matrix representing a 2D image and the pre-processing module 520 can 'flatten' that data 518 into a 1D array prior to sending to the trained model 514. The data 518 can include the first encoded acoustic image, e.g., TFM image, generated in a medium, e.g., water. The pre-processing module 520 generates a formatted data, which is input into the trained model 514 to generate an output 522 that can include a representation of a profile of one or more surfaces of an object under inspection.

In some examples, the representation of the profile can include an equation that defines at least a portion of the profile of the surface. In other examples, the representation of the profile of the surface can include an image of the profile of the surface, where the image includes pixels. In some implementations, the pre-processing module 508 and the pre-processing module 520 can be the same module.

The machine learning model in training 510 can be selected from among many different potential supervised or unsupervised machine learning algorithms. Examples of learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, a region based CNN, a full CNN (for semantic segmentation), a mask R-CNN algorithm for instance segmentation, and hidden Markov models. Examples of unsupervised learning algorithms include expectation-maximization algorithms, vector quantization, and information bottleneck method.

In this manner, the machine learning module 500 of FIG. 5 can assist in implementing a computerized method of image processing using processing circuitry to apply a previously trained machine learning model in a system for non-destructive testing (NDT) of a material, in accordance with this disclosure.

The techniques shown and described in this document can be performed using a portion or an entirety of an inspection system 100 as shown in FIG. 1 or otherwise using a machine 600 as discussed below in relation to FIG. 6. For example, the machine learning module described in FIG. 5 can be implemented using the processor 102 of FIG. 1 or the processor 602 in FIG. 6.

FIG. 6 illustrates a block diagram of an example of a machine upon which any one or more of the techniques (e.g., methodologies) discussed herein can perform. In alternative embodiments, the machine 600 can operate as a standalone device or are connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 is a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 600 can perform one or more of the processes described above. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms (all referred to hereinafter as "modules"). Modules are tangible entities (e.g., hardware) capable of performing specified operations and is configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software can reside on a non-transitory computer readable storage medium or other machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software can accordingly configure a hardware processor, for example, to constitute a particular module at one instance of time and to constitute a different module at a different instance of time.

Machine (e.g., computer system) 600 can include a hardware processor 602 (e.g., a central processing unit (CPU), a graphics processing unit (GPU), a hardware processor core, a Tensor Processing Unit (TPU), a Field-Programmable Gate Array (FPGA), an Application-Specific Integrated Circuit (ASIC), or any combination thereof), a main memory 604, and a static memory 606, some or all of which can communicate with each other via an interlink 608 (e.g., bus). The machine 600 can further include a display unit 610, an alphanumeric input device 612 (e.g., a keyboard), and a user interface (UI) navigation device 614 (e.g., a mouse). In an example, the display unit 610, input device 612 and UI navigation device 614 are a touch screen display. The machine 600 can additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 can include a machine readable medium 622 on which is stored one or more sets of data structures or instructions 624 (e.g., software) embodying or utilized by any one or more of the techniques or functions described herein. The instructions 624 can also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 can constitute machine readable media.

While the machine readable medium 622 is illustrated as a single medium, the term "machine readable medium" can include a single medium or multiple media (e.g., a centralized or distributed database, and/or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media can include non-transitory machine-readable media. In some examples, machine readable media can include machine readable media that is not a transitory propagating signal.

The instructions 624 can further be transmitted or received over a communications network 626 using a transmission medium via the network interface device 620. The machine 600 can communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 502.11 family of standards known as Wi-Fi®, IEEE 502.16 family of standards known as WiMax®), IEEE 502.15.4 family of standards, a Long Term Evolution (LTE) family of standards, a Universal Mobile Telecommunications System (UMTS) family of standards, peer-to-peer (P2P) networks, among others.

In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) techniques. In some examples, the network interface device 620 can wirelessly communicate using Multiple User MIMO techniques.

Examples, as described herein, can include, or can operate on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client, or server computer system) or one or more hardware processors are configured by firmware or software (e.g., instructions, an application portion, or an application) as a module that operates to perform specified operations. In an example, the software can reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software can accordingly configure a hardware processor, for example, to constitute a particular module at one instance of time and to constitute a different module at a different instance of time.

Various embodiments are implemented fully or partially in software and/or firmware. This software and/or firmware can take the form of instructions contained in or on a non-transitory computer-readable storage medium. Those instructions can then be read and executed by one or more processors to enable performance of the operations described herein. The instructions are in any suitable form, such as but not limited to source code, compiled code, interpreted code, executable code, static code, dynamic code, and the like. Such a computer-readable medium can include any tangible non-transitory medium for storing information in a form readable by one or more computers, such as but not limited to read only memory (ROM); random access memory (RAM); magnetic disk storage media; optical storage media; flash memory; etc.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in an aspect are still deemed to fall within the scope of that aspect. Moreover, in the following aspects, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the aspects. Also, in the above Detailed Description, various features may be grouped together to streamline the disclosure. This should not be interpreted as intending that an unclaimed disclosed feature is essential to any aspect. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments may be combined with each other in various combinations or permutations. The scope of the invention should be determined with reference to the appended aspects, along with the full scope of equivalents to which such aspects are entitled.

The claimed invention is:

1. A computerized method of automatically determining a representation of a profile of a surface of an object using a trained machine learning model, the method comprising:
    obtaining acoustic imaging data of the object;
    generating, using the acoustic imaging data and a time-of-flight (TOF) delay associated with a medium, a first encoded acoustic image of the object; and
    applying a previously trained machine learning model to the first encoded acoustic image to generate the representation of the profile of the surface.

2. The computerized method of claim 1, wherein the representation of the profile of the surface includes an image of the profile of the surface, and wherein the image includes pixels.

3. The computerized method of claim 2, comprising:
    performing a curve fitting using the image of the profile of the surface;
    recomputing the TOF delay based on the curve fitting; and
    generating a second encoded acoustic image of the object using the recomputed TOF delay.

4. The computerized method of claim 1, wherein obtaining the acoustic imaging data includes:
performing acoustic acquisition techniques to obtain the acoustic imaging data.

5. The computerized method of claim 1, wherein the first encoded acoustic image is a total focusing method (TFM) image.

6. The computerized method of claim 1, wherein obtaining acoustic imaging data of the object includes:
obtaining acoustic imaging data of the object using full matrix capture techniques.

7. The computerized method of claim 1, wherein obtaining acoustic imaging data of the object includes:
obtaining acoustic imaging data of the object using virtual source aperture techniques.

8. The computerized method of claim 1, wherein obtaining acoustic imaging data of the object includes:
obtaining acoustic imaging data of the object using half matrix capture techniques.

9. The computerized method of claim 1, wherein obtaining acoustic imaging data of the object includes:
obtaining acoustic imaging data of the object using plane wave imaging capture techniques.

10. An ultrasound inspection system for automatically determining a representation of a profile of a surface of an object using a trained machine learning model, the system comprising:
an ultrasonic probe assembly; and
a processor in communication with the ultrasonic probe assembly, the processor configured for:
obtaining acoustic imaging data of the object
generating, using the acoustic imaging data and a time-of-flight (TOF) delay associated with a medium, a first encoded acoustic image of the object; and
applying a previously trained machine learning model to the first encoded acoustic image to generate the representation of the profile of the surface.

11. The system of claim 10, wherein the representation of the profile of the surface includes an image of the profile of the surface, and wherein the image includes pixels.

12. The system of claim 11, wherein the processor is further configured for:
performing a curve fitting using the image of the profile of the surface;
recomputing the TOF delay based on the curve fitting; and
generating a second encoded acoustic image of the object using the recomputed TOF delay.

13. The system of claim 10, wherein the processor configured for obtaining the acoustic imaging data is configured for:
performing acoustic acquisition techniques to obtain the acoustic imaging data.

14. The system of claim 10, wherein the first encoded acoustic image is a total focusing method (TFM) image.

15. The system of claim 10, wherein the processor configured for obtaining acoustic imaging data of the object is configured for:
obtaining acoustic imaging data of the object using full matrix capture techniques.

16. The system of claim 10, wherein the processor configured for obtaining acoustic imaging data of the object is configured for:
obtaining acoustic imaging data of the object using virtual source aperture techniques.

17. The system of claim 10, wherein the processor configured for obtaining acoustic imaging data of the object is configured for:
obtaining acoustic imaging data of the object using half matrix capture techniques.

18. The system of claim 10, wherein the processor configured for obtaining acoustic imaging data of the object is configured for:
obtaining acoustic imaging data of the object using plane wave imaging capture techniques.

19. The system of claim 10, wherein the representation of the profile of the surface represents a geometric shape or a contour of at least a portion of the profile of the surface.

* * * * *

UNITED STATES PATENT AND TRADEMARK OFFICE
CERTIFICATE OF CORRECTION

PATENT NO. : 11,906,468 B2
APPLICATION NO. : 17/649818
DATED : February 20, 2024
INVENTOR(S) : Kraljic et al.

Page 1 of 1

It is certified that error appears in the above-identified patent and that said Letters Patent is hereby corrected as shown below:

In the Claims

In Column 17, Line 31, in Claim 10, delete "object" and insert --object;-- therefor Signed and Sealed this
First Day of April, 2025

Coke Morgan Stewart
*Acting Director of the United States Patent and Trademark Office*